United States Patent [19]

Lux, Jr.

[11] 4,267,399

[45] May 12, 1981

[54] TRANSFORMER PAD WITH CABLE PROTECTIVE SLEEVE

[75] Inventor: Robert J. Lux, Jr., Broken Arrow, Okla.

[73] Assignee: Thermodynamics Corporation, Broken Arrow, Okla.

[21] Appl. No.: 156,165

[22] Filed: Jun. 3, 1980

Related U.S. Application Data

[63] Continuation of Ser. No. 7,419, Jan. 29, 1979, abandoned.

[51] Int. Cl.³ .............................................. H02B 5/00
[52] U.S. Cl. .......................................... 174/1; 174/38; 248/1; 248/346; 336/65
[58] Field of Search ................. 174/1, 38; 248/1, 346, 248/678, 679; 336/65; 52/292, 294

[56] References Cited

U.S. PATENT DOCUMENTS

| | | | |
|---|---|---|---|
| 3,341,718 | 9/1967 | Acker | 174/38 X |
| 3,580,982 | 5/1971 | Havewala | 174/38 X |
| 3,962,660 | 6/1976 | Duckett | 336/65 |
| 4,023,755 | 5/1977 | Alesi, Jr. | 336/65 X |
| 4,056,251 | 11/1977 | Dixon et al. | 336/65 X |

FOREIGN PATENT DOCUMENTS 166600  3/1959  Sweden ..................................... 174/38

*Primary Examiner*—Laramie E. Askin
*Attorney, Agent, or Firm*—Head & Johnson

[57] ABSTRACT

A pad for supporting a transformer upon the earth's surface having an improved safety feature, the pad being formed of rigid material configured to rest upon the earth's surface and support a transformer and transformer housing on the upper surface thereof, the pad having a cable opening communicating between the top and bottom surfaces, and a hollow sleeve of rigid material, the sleeve being received in the pad cable opening and arranged such that the upper end of the sleeve extends above the pad top surface, the sleeve preventing objects inserted between the housing and the pad from engaging cables passing through the cable opening.

5 Claims, 3 Drawing Figures

TRANSFORMER PAD WITH CABLE PROTECTIVE SLEEVE

This is a continuation application of Ser. No. 7,419, filed Jan. 29, 1979, now abandoned.

BACKGROUND OF THE INVENTION

In recent years many of the new residential developments in the United States and in foreign countries have emphasized the use of underground electrical service. This system eliminates the need for pole lines and above-ground wiring, thus substantially enhancing the appearance of a residential development. The placement of transformers at ground location rather than on poles has created the need for platforms or pads to support the transformers. Others have created transformer pads such as shown in U.S. Pat. Nos. 3,962,660; 4,056,251; and 4,023,755.

One problem with locating transformers on the ground surface is that of making certain they are safe. The problem is particularly critical as far as safety of children is concerned. Normally transformers are set on a pad with the transformers covered by a metal covering or housing. If any slight space exists between the lower edge of the housing and the top surface of the pad, children frequently are tempted to stick objects in this space. The typical transformer pad has a cable opening therein so that wiring from underground passes up through the opening and is connected to the transformer. If objects are inserted beneath the lower edge of the transformer covering, they can engage these cables, and if the objects are of metal, they can conduct electricity and a shock can occur.

Others have considered the problem of the safety of transformer pads and particularly the protection of objects extending under the transformer cover to engage wires. Pat. No. 3,962,660 teaches an integral ridge formed around the cable opening to act as a means to prevent tampering. This concept is satisfactory except that it requires the design of the pad to include provisions of this integral ridge and further, the ridge must be configured so that the outer periphery matingly engages the transformer covering. Since different transformer manufacturers have different sizes and shapes of housings, such an arrangement requires that the transformer pad be particularly designed for each specific transformer manufacturer and even with a given manufacturer, different molds are required to produce the integral raised ridge for different sizes of transformer housings.

The present invention is directed to a transformer pad which is tamper-proof by providing an arrangement wherein the cables extending through the cable openings are protected from engagement by objects extended under the transformer cover.

It is therefore an object of this invention to provide an improved transformer pad for mounting of transformers on the earth's surface. More particularly, an object of this invention is to provide a transformer pad including an improved means of making the transformer pad tamper-proof in a manner such that the transformer pad does not require a mold providing integral ridges and in a manner so that a single transformer pad is adaptable to receive a variety of sizes and configurations of transformers and transformer covers.

These general objects as well as other and more specific objects of the invention will be fulfilled in the following description and claims, taken in conjunction with the attached drawings.

DESCRIPTION OF THE VIEWS

SUMMARY OF THE INVENTION

A transformer pad including a tamper-proof sleeve is provided. The pad is in the form of a base of material sufficient to provide strength to support a transformer thereon. The pad is adapted to be positioned on the surface of the earth with a transformer supported on the upper surface. The pad includes a cable opening therethrough by which electrical conductors from below the earth's surface extend to connect to a transformer mounted on the pad. The transformer includes a housing so that the conductors are completely concealed and protected from inadvertent contact by people or animals. A hollow sleeve of rigid material is received in the pad cable opening and is dimensioned such that the upper end of the sleeve extends above the top surface of the pad. The interior of the sleeve is dimensioned to receive the conductors therethrough. The upper portion of the sleeve is of a height above the pad to provide tamper-proof protection so that objects pushed between the lower edge of the transformer housing and the pad top surface are prevented from engaging the conductors passing through the cable opening.

DETAILED DESCRIPTION

Figure 1:
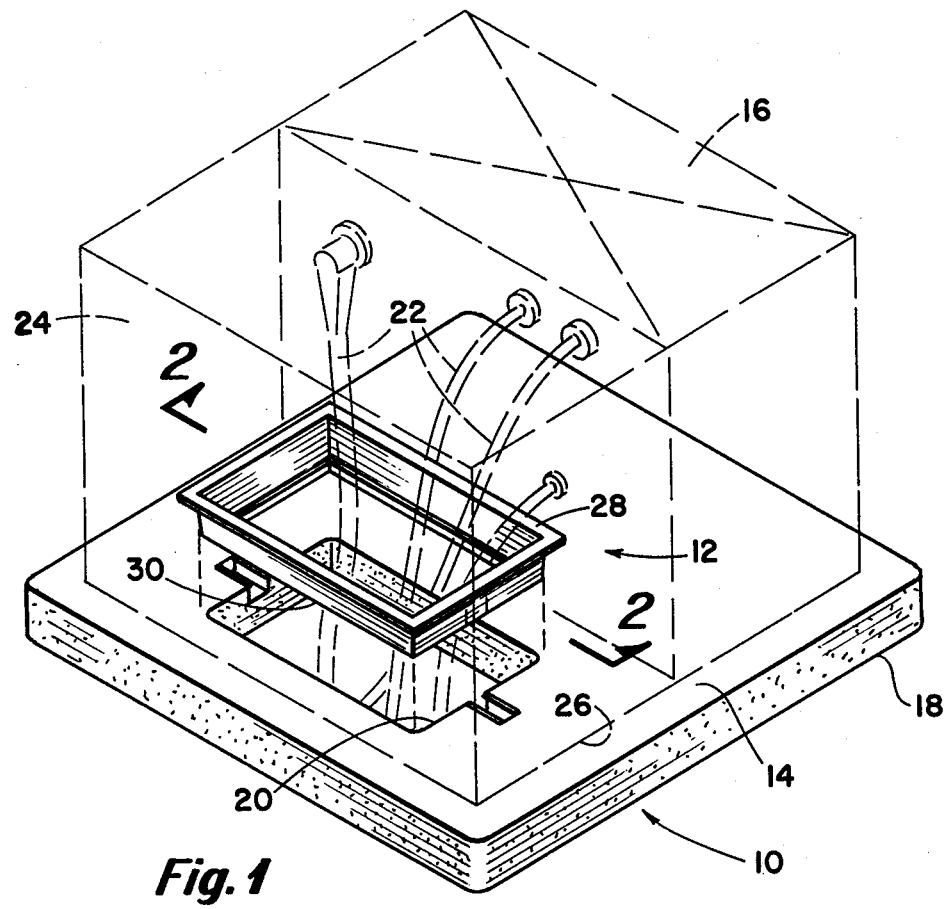
FIG. 1 is an isometric view of a transformer pad and tamper-proof sleeve of this invention showing the transformer and transformer housing mounted on the pad in dotted outline.

Referring to the drawings and first to FIG. 1, a transformer pad is indicated generally by the numeral 10 and the tamper-proof sleeve generally by the numeral 12. Pad 10 includes an upper surface 14 on which a transformer 16, indicated in dotted outline, is positioned. The pad lower surface 18 is adapted to be positioned on the earth's surface to support transformer 16.

Pad 10 includes a cable opening 20 through which conductors 22, indicated in dotted outline, extend from underground to connect to transformer 16.

To protect transformer 16 and conductors 22, a cover 24 indicated in dotted outline is attached to the transformer; and when in position, the transformer and cover together form a generally rectangular closed housing.

Since the transformer 16 is mounted on the earth's surface, it is readily exposed to the curiosity of children. The transformer 16 and cover 24 together form an enclosure which is normally made of metal and is of sufficient strength that children cannot penetrate the covering to expose themselves to the live electrical portions of the transformer or to the conductors 22. A problem exists, however, in that the lower edge 26 where it engages the top surface 14 of the pad may sometimes not fit sufficiently tight so as to prevent thin, long objects, such as pieces of wire or otherwise, from being pushed under the cover to engage conductors 22. The purpose of this invention is to provide a tamper-proof means of preventing long objects inserted between the top surface 14 of the pad 10 and the lower edge 26 of the transformer housing 24 from engaging the conductors 22.

To accomplish this objective, a sleeve 12 is utilized. The sleeve is hollow and of rigid material, such as plastic, fiberglass, etc. The sleeve can be of metal although it is preferably formed of non-conductive material. Sleeve 12 has an upper end 28 and a lower end 30 and is arranged such that when the sleeve is positioned in cable opening 20, the upper end 28 extends at a selected height above the pad top surface 14.

Figure 2:
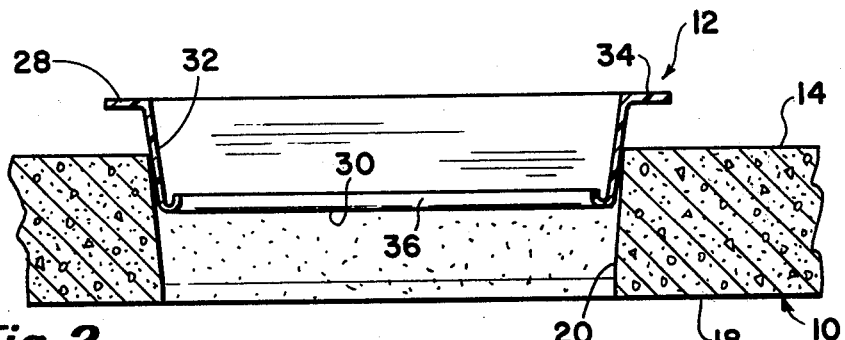
FIG. 2 is an enlarged cross-sectional view of a portion of the pad and tamper-proof sleeve of FIG. 1 taken along the line 2—2 of FIG. 1 and showing the sleeve mounted in position on the pad cable opening.

Referring to FIG. 2, one design of sleeve 12 is illustrated. In this design the sidewalls 32 of the sleeve are tapered so that when the sleeve is pushed down into opening 20 it forms a wedged fit with the top 28 well above the pad top surface 14. The cable opening 20 in the pad may be tapered as illustrated to receive the tapered sidewalls 32, or, the cable opening 20 may have straight sidewalls.

The upper end 28 of the sleeve includes a peripheral lip 34. This lip has two functions. First, it reinforces and adds strength and rigidity to the sleeve 12. Second, the lip extends out so as to tend to intercept objects extended under the cover lower edge 26 and help prevent them from being deflected upwardly above the sleeve to engage conductors 22.

In the illustrated embodiment of FIG. 2, the lower edge 30 includes an internal lip 36 which serves to strengthen and reinforce the sleeve.

An advantage of the tapered sleeve arrangement of FIG. 2 is that sleeves may be stacked readily for shipment to thereby reduce their volume. In addition, the tapered configuration eliminates the necessity for high accuracy in the formation of the sleeves compared to the cable opening 20. Deviations in the dimensions will result only in the slight difference in height of the upper end 28 above the pad top surface 14.

Figure 3:
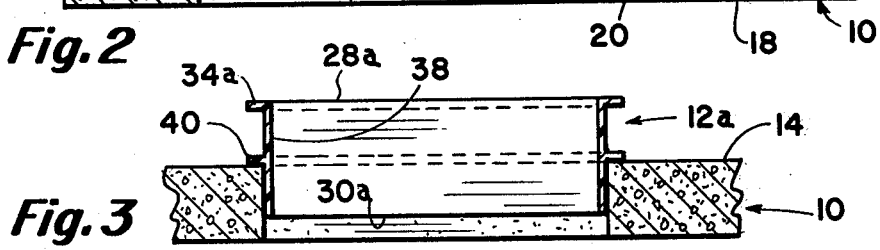
FIG. 3 is an enlarged fragmentary cross-sectional view as shown in FIG. 2 showing an alternate design of a tamper-proof sleeve.

FIG. 3 is a cross-sectional view as shown in FIG. 2 showing an alternate embodiment of the invention. In this embodiment the sleeve sidewalls 38 from the flange 34a to the bottom end 30a are parallel. To retain the sleeve 12a within the cable opening 20 so that the upper end 28a is at a preselected height above the pad upper surface 14, an intermediate integral flange 40 is formed which engages the pad top surface 14 around the peripheral upper edge of cable opening 20. In this arrangement the height of sleeve top end 28a above the pad top surface 14 is preselected by the design of the sleeve and determined by the spacing between the upper end 28a and the flange 40.

Comparing FIG. 3 with FIG. 2 demonstrates that the construction of the sleeve to accomplish the purposes of this invention may vary considerably and the embodiments illustrated in FIGS. 2 and 3 are merely exemplary of the invention.

Pad 10 may be constructed of a variety of materials. A common method of forming a transformer pad is to provide an outer casing or shell of plastic, concrete or fiberglass material with an internal filler such as foam plastic. The pads may be strengthened by reinforcing members of metal or wood. None of these details of construction are shown since they are well-known to manufacturers of transformer pads. In addition, transformer pads typically include brackets, holes, and other features for securing the transformer 16 to the pad. These elements are not shown for the same reason, that is, they are already well-known in the industry.

The invention provides a unique, yet simple and inexpensive means of adding tamper-proof protection to a transformer pad to enhance the safety of ground-mounted transformers.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A means for supporting a transformer upon the earth's surface comprising:

a pad of rigid material having an upper and lower surface, the lower surface adapted to engage the earth's surface and the upper surface adapted to receive and support a transformer thereon, the pad having a cable opening therein communicating between the lower and upper surfaces; and a hollow sleeve of rigid material of short height, having an upper and lower end and an outer and inner surface, the outer surface being non-cylindrical and configured to provide an interference fit with said pad cable opening, the sleeve being removably received and supported by said pad in said cable opening and dimensioned such that the upper end extends above the upper surface of said pad, the interior of the sleeve being dimensioned to receive cables therethrough.

2. A means for supporting a transformer upon the earth's surface according to claim 1 wherein the outer surface of said sleeve is tapered from the upper end towards the lower end, the external dimensions of the upper end being greater than the dimensions of said cable opening in said pad whereby said sleeve may be wedged into said pad cable opening and the upper end extends above said pad upper surface.

3. A means for supporting a transformer upon the earth's surface according to claim 1 wherein said sleeve includes integral reinforcing means at the upper end and lower end.

4. A means for supporting a transformer upon the earth's surface according to claim 3 wherein said reinforcing means at the upper end is in the form of a generally horizontally outwardly extending integral lip.

5. A means for supporting a transformer upon the earth's surface according to claim 1 wherein said sleeve includes an integral external flange intermediate the upper and lower ends, the flange engaging the upper surface of said pad.

* * * * *